United States Patent
Iida et al.

(10) Patent No.: US 10,919,311 B2
(45) Date of Patent: *Feb. 16, 2021

(54) INK JET INK COMPOSITION, INK JET RECORDING METHOD, AND INK SET

(71) Applicant: Seiko Epson Corporation, Tokyo (JP)

(72) Inventors: Keiji Iida, Chikuhoku (JP); Kenichiro Kubota, Matsumoto (JP); Naoki Koike, Matsumoto (JP); Jun Ito, Shimosuwa (JP); Makoto Nagase, Shiojiri (JP)

(73) Assignee: Seiko Epson Corporation

( * ) Notice: Subject to any disclaimer, the term of this patent is extended or adjusted under 35 U.S.C. 154(b) by 109 days.

This patent is subject to a terminal disclaimer.

(21) Appl. No.: 15/551,770

(22) PCT Filed: Jan. 25, 2016

(86) PCT No.: PCT/JP2016/000357
§ 371 (c)(1),
(2) Date: Aug. 17, 2017

(87) PCT Pub. No.: WO2016/136134
PCT Pub. Date: Sep. 1, 2016

(65) Prior Publication Data
US 2018/0037761 A1  Feb. 8, 2018

(30) Foreign Application Priority Data
Feb. 24, 2015 (JP) ................. 2015-033764

(51) Int. Cl.
*B41J 2/21* (2006.01)
*C09D 11/322* (2014.01)
*C09D 11/40* (2014.01)
*C09D 11/36* (2014.01)

(52) U.S. Cl.
CPC .......... *B41J 2/2107* (2013.01); *C09D 11/322* (2013.01); *C09D 11/36* (2013.01); *C09D 11/40* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | |
|---|---|---|---|
| 6,048,390 | A | 4/2000 | Yano et al. |
| 6,613,136 | B1 | 9/2003 | Arita et al. |
| 6,802,893 | B1 | 10/2004 | Komatsu et al. |
| 7,125,447 | B2 | 10/2006 | Sugita et al. |
| 7,806,972 | B2 | 10/2010 | Sugita et al. |
| 7,871,467 | B2 | 1/2011 | Sano et al. |
| 7,897,657 | B2 | 3/2011 | Nakano et al. |
| 8,016,931 | B2 | 9/2011 | Mizutani et al. |
| 8,216,356 | B2 | 7/2012 | Nishikawa |
| 8,440,745 | B2 | 5/2013 | Kotera et al. |
| 8,474,967 | B2 | 7/2013 | Aoki et al. |
| 8,586,656 | B2 | 11/2013 | Shiotani et al. |
| 8,991,996 | B2 | 3/2015 | Nagase et al. |
| 9,028,055 | B2 | 5/2015 | Kubota et al. |
| 9,056,992 | B2 | 6/2015 | Sao et al. |
| 9,151,874 | B2 | 10/2015 | Taima et al. |
| 9,193,882 | B2 | 11/2015 | Aruga et al. |
| 9,238,744 | B2 | 1/2016 | Kubota et al. |
| 9,650,529 | B2 | 5/2017 | Murai et al. |
| 9,725,610 | B2 | 8/2017 | Iida et al. |

(Continued)

FOREIGN PATENT DOCUMENTS

| | | |
|---|---|---|
| CN | 102233719 A | 11/2011 |
| CN | 102532986 A | 7/2012 |

(Continued)

OTHER PUBLICATIONS

Extended European Search Report for EP Application No. 16754891.6, dated Jun. 28, 2018 (5 pages).

(Continued)

*Primary Examiner* — Manish S Shah

(74) *Attorney, Agent, or Firm* — Harness, Dickey & Pierce, P.L.C.

(57) ABSTRACT

An ink jet ink composition is provided that can form an image having excellent weather resistance, abrasion resistance, and coloring property. The non-aqueous ink jet ink composition includes at least one solvent represented by $R^1O-(R^2O)_m-R^3$ and having a flash point of 140° C. or lower and C.I. Pigment Orange-43 (PO-43) as a pigment, wherein $R^1$ and $R^3$ each independently represent hydrogen or an alkyl group having 1 to 5 carbon atoms, $R^2$ represents an alkylene group having 2 or 3 carbon atoms, and m represents an integer of 2 to 6.

11 Claims, No Drawings

(56) References Cited

U.S. PATENT DOCUMENTS

| | | | |
|---|---|---|---|
| 9,758,685 B2 | 9/2017 | Ito et al. | |
| 9,758,686 B2 | 9/2017 | Nagase et al. | |
| 9,804,308 B2 | 10/2017 | Nakajima | |
| 10,400,124 B2* | 9/2019 | Kubota | B41J 2/01 |
| 2003/0019398 A1 | 1/2003 | Komatsu et al. | |
| 2003/0116055 A1 | 6/2003 | Kubota et al. | |
| 2004/0066438 A1 | 4/2004 | Taguchi et al. | |
| 2004/0266907 A1 | 12/2004 | Sugita et al. | |
| 2005/0020717 A1 | 1/2005 | Sasa | |
| 2005/0124726 A1 | 6/2005 | Yatake et al. | |
| 2007/0120920 A1 | 5/2007 | Taguchi et al. | |
| 2007/0270525 A1 | 11/2007 | Sugita et al. | |
| 2007/0293601 A1 | 12/2007 | Ushiku et al. | |
| 2008/0081119 A1 | 4/2008 | Oyanagi et al. | |
| 2008/0097005 A1 | 4/2008 | Shiotani | |
| 2008/0166655 A1 | 7/2008 | Ogata et al. | |
| 2008/0173214 A1 | 7/2008 | Oyanagi et al. | |
| 2008/0308006 A1 | 12/2008 | Deroover | |
| 2009/0011264 A1 | 1/2009 | Ohkubo et al. | |
| 2009/0029119 A1 | 1/2009 | Nishikawa | |
| 2009/0030144 A1 | 1/2009 | Mizutani et al. | |
| 2009/0088495 A1 | 4/2009 | Mikami et al. | |
| 2009/0090271 A1 | 4/2009 | Wynants et al. | |
| 2009/0118418 A1 | 5/2009 | Nakano et al. | |
| 2009/0169834 A1 | 7/2009 | Sano et al. | |
| 2009/0235843 A1 | 9/2009 | Sugita et al. | |
| 2009/0305156 A1 | 12/2009 | Weber et al. | |
| 2010/0029813 A1 | 2/2010 | Deroover et al. | |
| 2010/0047455 A1 | 2/2010 | Hoogmartens | |
| 2010/0073450 A1 | 3/2010 | Katagami et al. | |
| 2010/0083875 A1 | 4/2010 | Nakao | |
| 2010/0093900 A1 | 4/2010 | Ohya et al. | |
| 2010/0174013 A1 | 7/2010 | Sugita et al. | |
| 2010/0265309 A1 | 10/2010 | Kaneko et al. | |
| 2010/0280158 A1 | 11/2010 | Shiotani et al. | |
| 2011/0009537 A1 | 1/2011 | Kotera et al. | |
| 2011/0143275 A1 | 6/2011 | Obata et al. | |
| 2011/0234728 A1 | 9/2011 | Aoki et al. | |
| 2011/0242241 A1 | 10/2011 | Chun et al. | |
| 2011/0292141 A1 | 12/2011 | Sao et al. | |
| 2011/0315049 A1 | 12/2011 | Aoki et al. | |
| 2012/0056929 A1 | 3/2012 | Sao et al. | |
| 2012/0306964 A1 | 12/2012 | Nakajima | |
| 2013/0050365 A1 | 2/2013 | Irita | |
| 2013/0100523 A1 | 4/2013 | Taima et al. | |
| 2013/0120492 A1 | 5/2013 | Kubota et al. | |
| 2013/0194362 A1 | 8/2013 | Sao et al. | |
| 2013/0250406 A1 | 9/2013 | Nakajima | |
| 2013/0310496 A1 | 11/2013 | Shiotani et al. | |
| 2014/0333696 A1* | 11/2014 | Nagase | B41J 2/01 347/20 |
| 2014/0349087 A1 | 11/2014 | Jung et al. | |
| 2015/0015118 A1 | 1/2015 | Kamijo | |
| 2015/0184011 A1 | 7/2015 | Shimura et al. | |
| 2015/0210878 A1 | 7/2015 | Iida et al. | |
| 2016/0115330 A1 | 4/2016 | Koike et al. | |
| 2016/0168405 A1 | 6/2016 | Ito et al. | |
| 2016/0208105 A1 | 7/2016 | Nishiura et al. | |
| 2016/0222229 A1 | 8/2016 | Yamada et al. | |
| 2016/0222235 A1 | 8/2016 | Iida et al. | |
| 2016/0237291 A1 | 8/2016 | Nagase et al. | |
| 2016/0264805 A1 | 9/2016 | Nagase et al. | |
| 2017/0210923 A1 | 7/2017 | Kubota et al. | |
| 2017/0210924 A1 | 7/2017 | Kubota et al. | |
| 2017/0210925 A1 | 7/2017 | Hattori et al. | |
| 2017/0218216 A1 | 8/2017 | Kubota et al. | |
| 2018/0037761 A1 | 2/2018 | Iida et al. | |
| 2018/0057701 A1 | 3/2018 | Kubota et al. | |

FOREIGN PATENT DOCUMENTS

| | | |
|---|---|---|
| EP | 1790698 A1 | 5/2007 |
| EP | 1857510 A1 | 11/2007 |
| EP | 1992670 A1 | 11/2008 |
| EP | 2025725 A1 | 2/2009 |
| EP | 2105476 A2 | 9/2009 |
| EP | 2492321 A1 | 8/2012 |
| EP | 2597497 A1 | 5/2013 |
| EP | 2650706 A1 | 10/2013 |
| EP | 3012299 A1 | 4/2016 |
| EP | 3034571 A1 | 6/2016 |
| EP | 3199598 A1 | 8/2017 |
| EP | 3263658 A1 | 1/2018 |
| JP | H11-310714 A | 11/1999 |
| JP | 2004-070048 A | 3/2004 |
| JP | 2004-306441 A | 11/2004 |
| JP | 2004-352917 A | 12/2004 |
| JP | 2006-243588 A | 9/2006 |
| JP | 2007-023265 A | 2/2007 |
| JP | 2007-177190 A | 7/2007 |
| JP | 2007-204718 A | 8/2007 |
| JP | 2007-297634 A | 11/2007 |
| JP | 2007-314635 A | 12/2007 |
| JP | 2008-007774 A | 1/2008 |
| JP | 2008-075044 A | 4/2008 |
| JP | 2008-075067 A | 4/2008 |
| JP | 2008-233314 A | 10/2008 |
| JP | 2008-250188 A | 10/2008 |
| JP | 2009-001691 A | 1/2009 |
| JP | 2009-024072 A | 2/2009 |
| JP | 2009-052030 A | 3/2009 |
| JP | 2009-173853 A | 8/2009 |
| JP | 2009-227812 A | 10/2009 |
| JP | 2009-235383 A | 10/2009 |
| JP | 2010-018730 A | 1/2010 |
| JP | 2010-043149 A | 2/2010 |
| JP | 2010-150314 A | 7/2010 |
| JP | 2010-168583 A | 8/2010 |
| JP | 2010-270225 A | 12/2010 |
| JP | 2011-006541 A | 1/2011 |
| JP | 2011-046759 A | 3/2011 |
| JP | 2011-246571 A | 12/2011 |
| JP | 2012-012432 A | 1/2012 |
| JP | 2012-046671 A | 3/2012 |
| JP | 2013-104009 A | 5/2013 |
| JP | 2013-177597 A | 9/2013 |
| JP | 2014-091795 A | 5/2014 |
| JP | 2014-132050 A | 7/2014 |
| JP | 2014-237803 A | 12/2014 |
| JP | 2015-019142 A | 1/2015 |
| JP | 2015-140399 A | 8/2015 |
| JP | 2015-196731 A | 11/2015 |
| JP | 2016-113531 A | 6/2016 |
| JP | 2016-141746 A | 8/2016 |
| JP | 2016-150985 A | 8/2016 |
| JP | 2016-155909 A | 9/2016 |
| JP | 2016-155910 A | 9/2016 |
| JP | 2016-166311 A | 9/2016 |
| WO | WO-2004-007626 A1 | 1/2004 |
| WO | WO-2007-072804 A1 | 6/2007 |
| WO | WO-2016-136134 A1 | 9/2016 |

OTHER PUBLICATIONS

DOW Chemical Company Product Information on Glycol Ethers, Form No. 110-00877-702, Jul. 2002 (6 pages).

Sigma-Aldrich Safety Data Sheet for Diethylene glycol diethyl ether, Version 4.11, revised Dec. 11, 2017 (8 pages).

Sigma-Aldrich Safety Data Sheet for Triethylene glycol monobutyl ether, Version 5.4. revised Jan. 5, 2017, (7 pages).

Isao Hashimoto, Organic Pigments Handbook, published by Isao Hashimoto, Color Office, Tokyo, Japan, pp. 496-507 (May 2006). IP.com search.

* cited by examiner

INK JET INK COMPOSITION, INK JET RECORDING METHOD, AND INK SET

BACKGROUND

Technical Field

The present invention relates to an ink jet ink composition and an ink jet recording method.

Background Art

There is known an ink jet recording apparatus that causes minute liquid droplets of ink to eject from nozzle holes of a recording head, and causes the liquid droplets to adhere to a recording medium to record images and characters. In addition, as an ink used for such recording, for example, an ink jet ink containing various components such as a coloring material, a surfactant, water, and an organic solvent is known. In addition, in ink jet ink composition, a solvent-based (non-aqueous) ink composition that does not use water as a main solvent has been developed.

For example, Japanese Unexamined Patent Application Publication No. 2012-012432 discloses an ink composition containing a hydrocarbon-based solvent, a solvent having an ester group and an ether group, and a solvent soluble in both, Japanese Unexamined Patent Application Publication No. 2012-046671 discloses an ink composition blended with an amide-based solvent (ether amides), and Japanese Unexamined Patent Application Publication No. 2010-018730 discloses an ink composition in which three types of alcohols having different boiling points are blended, respectively. Such a non-aqueous ink composition has good adaptability to a vinyl chloride-based recording medium, and is used for recording in many cases, for example, so-called signature applications such as outdoor signboards.

However, in a case where a non-aqueous ink jet ink composition is used for a signature application, weather resistance of a recorded matter may be insufficient in some cases. That is, the recorded matter for the signature application is used in an outdoor environment exposed to rain, sunlight, and the like in many cases, and higher weather resistance than indoor use is required. According to the inventors, among the inks, when trying to expand the color reproduction range of a warm color by using an ink containing an orange pigment, it has been found that it is important to prepare an ink excellent in weather resistance and it is important to make the ink having a particularly wide color reproduction range of the warm color. In addition, it has been found that the coloring property of the ink is important in order to sufficiently demonstrate the function of expanding the color reproduction range.

As a means for improving the weather resistance of the ink jet ink composition, it is conceivable to use a coloring material having high weather resistance. However, in ink jet recording, many performances are required for each of a plurality of configurations such as an ink composition, a recording apparatus, and a recording medium, and furthermore, a high balance between configurations is required. Therefore, merely selecting a material having the high weather resistance as the coloring material is concerned that another performance of the ink jet ink composition becomes insufficient. Furthermore, in order to improve an image quality of the recorded matter, in a case where a solvent having a relatively low boiling point is contained as a solvent in the non-aqueous ink composition, the coloring property of the ink deteriorates in some cases.

In order to expand the color reproduction range of a warm color while maintaining the overall performance of the ink jet ink composition, and to improve an image quality of recorded matter, the weather resistance, and the coloring property, the inventors have found that a combination of a specific pigment type and a solvent is important and have made the present invention.

That is, an object of some aspects of the present invention is to provide an ink jet ink composition that can form an image having a wide color reproduction range of a warm color and excellent in the weather resistance, the coloring property, and the image quality. In addition, another object is to provide an ink set and an ink jet recording method with excellent in the weather resistance, the coloring property, and the image quality.

SUMMARY

The invention has been made to solve at least a portion of the above problems, and can be realized as the following aspects or application examples. Such an ink jet ink composition has excellent color reproduction range of the warm color and excellent in the weather resistance. Furthermore, the coloring property and image quality of the recorded matter are excellent.

Application Example 1

[1]

A non-aqueous ink jet ink composition including at least one solvent represented by General Formula (1) and having a flash point of 140° C. or lower, and C.I. Pigment Orange-43 (PO-43) as a pigment.

$$R^1O\text{---}(R^2O)_m\text{---}R^3 \qquad (1)$$

In General Formula (1), $R^1$ and $R^3$ each independently represent hydrogen or an alkyl group having 1 to 5 carbon atoms, $R^2$ represents an alkylene group having 2 or 3 carbon atoms, and m represents an integer of 2 to 6. Here, at least one of $R^1$ and $R^3$ is the alkyl group having 1 to 5 carbon atoms.

[2]

The non-aqueous ink jet ink composition according to [1], in which the total content of the compound represented by General Formula (1) is 10% by mass or more and 95% by mass or less with respect to the total amount of the ink jet ink composition.

[3]

The non-aqueous ink jet ink composition according to [1] or [2] further including a solvent represented by General Formula (1) and having a flash point of 70° C. or lower.

[4]

The non-aqueous ink jet ink composition according to any one of [1] to [3] further including a glycol monoether which is the solvent represented by General Formula (1) and in which one of $R^1$ and $R^3$ is hydrogen.

[5]

The non-aqueous ink jet ink composition according to any one of [1] to [4], which is used for a recording method in which a surface temperature of a recording medium in a process of adhering an ink composition to the recording medium by an ink jet method, is 35° C. or higher.

[6]

The non-aqueous ink jet ink composition according to any one of [1] to [5] further including a fixing resin.

[7]

The non-aqueous ink jet ink composition according to any one of [1] to [6], which is used for recording on a vinyl chloride-based recording medium.

[8]

An ink set including at least the non-aqueous ink jet ink composition according to any one of [1] to [7], and a non-aqueous cyan ink jet ink composition, a non-aqueous magenta ink jet ink composition, and a non-aqueous yellow ink jet ink composition, each containing at least one solvent represented by General Formula (1) and having a flash point of 140° C. or lower and a pigment.

[9]

An ink jet recording method including performing recording on a recording medium by an ink jet method using the ink jet ink composition according to any one of [1] to [7], or the ink set according to [8].

DESCRIPTION OF EMBODIMENTS

Several embodiments of the present invention will be described below. The embodiments described below describe one example of the present invention. The present invention is not limited to the following embodiments at all, and includes various modifications which are performed without changing the gist of the invention. All of the configurations described below are not necessarily indispensable configurations of the present invention.

1. INK JET INK COMPOSITION

An ink jet ink composition according to the embodiment includes a solvent and a pigment. It is preferable that the ink jet ink composition according to the embodiment be a non-aqueous ink composition, and be a solvent-based ink composition containing a volatile solvent (mainly an organic solvent) as a main component. It is preferable that the ink be a non-photocurable ink which is adhered on a recording medium and thereafter dried by heating or at room temperature, and fixed a solid content to perform recording. The ink may be a photocurable ink which is cured by irradiation with radiation (light), but it is preferable that the ink be the non-photocurable ink from the viewpoint that the irradiation with radiation is unnecessary.

The non-aqueous ink composition does not contain water as a main solvent component, and is an ink composition not containing water as a functional component for exhibiting the function and performance of the ink. The content of water with respect to the ink composition is 5% by mass or less, more preferably 3% by mass or less, further preferably 1% by mass or less, particularly preferably 0.5% by mass or less, and more particularly preferably 0.1% by mass or less. Furthermore, the ink composition may not contain water. The content of the solvent in the non-aqueous ink jet ink composition in the embodiment is preferably 50% by mass or more, more preferably 70% by mass or more, further preferably 80% by mass or more, and particularly preferably 85% to 98% by mass.

1.1. Solvent

It is preferable that the solvent contained in the ink jet ink composition according to the embodiment contain at least one solvent which is a compound represented by the following General Formula (1). Hereinafter, the solvent which is the compound represented by the following General Formula (1) is referred to as a solvent A.

1.1.1. Compound Represented by Formula (1)

It is preferable that the ink jet ink composition according to the embodiment contain the solvent A which is a compound (glycol ether) represented by General Formula (1) as the solvent.

$R^1O—(R^2O)_m—R^3$ (1)

In General Formula (1), $R^1$ and $R^3$ each independently represent hydrogen or an alkyl group having 1 to 5 carbon atoms, $R^2$ represents an alkylene group having 2 or 3 carbon atoms, and m represents an integer of 2 to 6. Here, at least one of $R^1$ and $R^3$ is an alkyl group having 1 to 5 carbon atoms.

Among the above, $R^1$ and $R^3$ are each independently preferably hydrogen or an alkyl group having 1 to 4 carbon atoms, and m is preferably an integer of 2 to 3. Here, the alkyl group having 1 to 5 carbon atoms can be a linear or branched alkyl group, and specific examples thereof include a methyl group, an ethyl group, an n-propyl group, an isopropyl group, an n-butyl group, a sec-butyl group, or a tert-butyl group. In addition, examples of the alkylene group having 2 or 3 carbon atoms include an ethylene group (dimethylene) and propylene group (trimethylene or methyl ethylene). The compound represented by General Formula (1) is referred to as alkylene glycol alkyl ether or glycol ether. The compound represented by General Formula (1) may be contained alone, or two or more types thereof may be contained in combination.

Specific examples of the compound represented by General Formula (1) include diethylene glycol methyl ethyl ether (64° C.) (abbreviated as "DEGMEE" or "MEDG" in some cases.), diethylene glycol dimethyl ether (56° C.) (abbreviated as "DEGdME" in some cases.), dipropylene glycol dimethyl ether (65° C.), diethylene glycol diethyl ether (71° C.) (abbreviated as "DEGdEE" or "DEDG" in some cases.), diethylene glycol monomethyl ether (105° C.) (abbreviated as "DEGmME" in some cases.), diethylene glycol monoisobutyl ether (112° C.), diethylene glycol monoisopropyl ether (101° C.), diethylene glycol monohexyl ether (141° C.), diethylene glycol butyl methyl ether (94° C.) (abbreviated as "DEGBME" in some cases.), diethylene glycol dibutyl ether (122° C.) (abbreviated as "DEGdBE" in some cases.), dipropylene glycol monopropyl ether (108° C.), dipropylene glycol monobutyl ether (117° C.), triethylene glycol monomethyl ether (139°), triethylene glycol monobutyl ether (156° C.), triethylene glycol dimethyl ether (113° C.) (abbreviated as "TriEGdME" or "DMTG" in some cases.), tripropylene glycol monomethyl ether (123° C.), tripropylene glycol monobutyl ether (138° C.), tripropylene glycol dimethyl ether (104° C.), tetraethylene glycol monobutyl ether (177° C.) (abbreviated as "TetraEGmBE" or "BTG-H" in some cases.), tetraethylene glycol dimethyl ether (141° C.) (abbreviated as "TetraEGdME" in some cases.), and the like. The numerical values in parentheses in the above examples indicate flash points.

In a case where the flash point by a tag closed cup flash point tester is not 80° C. or lower, the flash point of the compound in the embodiment is set as the flash point by a Cleveland open cup flash point tester, and in a case where the flash point of the tag closed cup flash point tester is 80° C. or lower, it is set as the flash point by the tag closed cup flash point tester in a case where a kinematic viscosity of the solvent at the flash point is less than 10 cSt, and it is set as the flash point by a Seta closed cup flash point tester in a case where the kinematic viscosity of the solvent at the flash point is 10 cSt or more.

From the viewpoint of further improving the drying property of the ink jet ink composition, it is preferable to use a compound having the flash point of 140° C. or lower among these compounds. By using the compound having the flash point of 140° C. or lower, the drying property of the ink jet ink composition is enhanced, and aggregation unevenness (pigment aggregation, or the like) in the formed image is further less likely to occur, so that it can be excellent in the abrasion resistance.

In addition, these compounds can be mixed in the solvent and blended, but it is more preferable that the compound having the flash point of 140° C. or lower be blended. In a case where only a compound having the flash point higher than 140° C. is blended, drying of the ink jet ink composition may be delayed in some cases, the wet spreadability of the ink on the recording medium is enhanced, and glossiness of the image to be formed can be expected, whereas the aggregation unevenness (pigment aggregation, or the like) in the image to be formed may occur in some cases, for example. On the other hand, since the compound having the flash point of 140° C. or lower improves the drying property of the ink jet ink composition, by blending this compound, it is possible to cause aggregation unevenness (pigment aggregation, or the like) to be less likely to occur in the image to be formed. By balancing the blending amounts of the compound having the flash point of higher than 140° C. and the compound having the flash point of 140° C. or lower, it is possible to increase the glossiness of the image to be formed and to suppress the aggregation unevenness. In addition, the solvent A tends to have excellent dispersion stability of the pigment, and it is excellent in that the aggregation unevenness can be prevented from occurring in the process of drying the ink on the recording medium. Furthermore, it is preferable to blend the above compound (solvent A) having the flash point of 120° C. or lower, and it is more preferable to blend the above compound (solvent A) having the flash point of 70° C. or lower.

The content of the compound represented by Formula (1) with respect to the total amount of the ink jet ink composition (total amount in a case where a plurality of types thereof are used) is preferably 10% by mass or more and 95% by mass or less, more preferably 10% by mass or more and 90% by mass or less, further preferably 20% by mass or more and 80% by mass or less, further more preferably 30% by mass or more and 75% by mass or less, and particularly preferably 40% by mass or more and 70% by mass or less.

In addition, among the compounds of Formula (1), the content of the compound having the flash point of 140° C. or lower (total amount in a case where the plurality of types thereof are used) with respect to the total amount of the ink jet ink composition is preferably 10% by mass or more and 95% by mass or less, more preferably 10% by mass or more and 90% by mass or less, further preferably 20% by mass or more and 80% by mass or less, and further more preferably 40% by mass or more and 70% by mass or less. In addition, among the compounds of Formula (1), the content of the compound having the flash point of 120° C. or lower, more preferably 70° C. or lower (total amount in a case where the plurality of types thereof are used) with respect to the total amount of the ink jet ink composition is preferably 10% by mass or more and 95% by mass or less, more preferably 10% by mass or more and 90% by mass or less, further preferably 20% by mass or more and 80% by mass or less, and further more preferably 40% by mass or more and 70% by mass or less.

On the other hand, it is preferable to use the solvent A having the flash point of 140° C. or lower and higher than 70° C. among the compounds of Formula (1), from the viewpoint of placing more importance on particularly excellent aggregation unevenness suppression and abrasion resistance. Among the compounds of Formula (1), the content of the compound having the flash point of 140° C. or lower and higher than 70° C. (total amount in a case where the plurality of types thereof are used) to the total amount of the ink jet ink composition is preferably 10% by mass or more and 95% by mass or less, more preferably 10% by mass or more and 90% by mass or less, further preferably 20% by mass or more and 80% by mass or less, and further more preferably 40% by mass or more and 70% by mass or less.

In the case of containing a solvent having a lower flash point, particularly a solvent having a temperature of 140° C. or lower among the compounds represented by Formula (1), the drying property of the ink composition is further improved, and the aggregation unevenness suppression and the abrasion resistance are further improved. On the other hand, since the drying property is relatively high, although there is a tendency that the spreadability in the direction of the surface of the recording medium of the ink is inferior, and the coloring property of the ink is inferior on the surface of the recording medium of the ink composition, even in such a case, since the ink composition contains Pigment Orange-43 (PO-43) as a pigment, it is possible to obtain excellent in the coloring property.

In a case where the ink contains a glycol monoether compound in which any one of $R^1$ and $R^3$ is hydrogen among the compounds represented by Formula (1), in addition to the above-described effect, it tends to be particularly excellent in reducing aggregation unevenness, which is preferable. In a case where the ink contains the glycol monoether compound, the content thereof is preferably 2% to 20% by mass, more preferably 3% to 15% by mass, and further more preferably 3% to 10% by mass in terms of the above points. The flash point of the glycol monoether compound does not matter.

1.1.2. Cyclic Ester Compound

It is preferable that the ink jet ink composition according to the embodiment contain a cyclic ester (cyclic lactone) as a solvent. By containing the cyclic ester (cyclic ester compound), the ink jet ink composition can dissolve a portion of a recording surface (preferably recording surface containing a vinyl chloride-based resin) of the recording medium and permeate the ink jet ink composition into the recording medium. Since the ink composition permeates into the recording medium in this manner, it is possible to improve the abrasion resistance (rubbing fastness) of the image recorded on the recording medium. In other words, since the cyclic ester has a high affinity with the vinyl chloride-based resin, the components of the ink jet ink composition are easily infiltrated (easy to bite) on the recording surface. As a result of the cyclic ester having such an action, it is considered that an ink jet ink composition blending the cyclic ester can form an image excellent in the abrasion resistance even under severe conditions such as outdoor environments. In addition, since a solubility of a solid component such as a fixing resin contained in the ink composition is excellent, it prevents deposition of resin in the ink during long-term storage or use of the ink and does not cause ejection failure when the ink is ejected from an ink jet head, or the pigment adhered to the surface of a recorded matter can be uniformly covered with the resin, so that the weather resistance of the recorded matter tends to be more excellent, which is preferable. On the other hand, since the cyclic ester promotes the permeation of the ink into the recording medium, it suppresses spreading of the ink in the lateral direction of the surface of the recording medium. Therefore, there is a tendency to hinder a coloring property of the ink composition in the recorded matter.

The cyclic ester is a compound having a structure in which a hydroxyl group and a carboxyl group are dehydrated and condensed in the molecule in one molecule having the hydroxyl group and the carboxyl group. The cyclic ester has a heterocyclic ring containing two or more carbon atoms and one oxygen atom, and has a structure in which a carbonyl group is arranged adjacent to the oxygen atom forming the heterocyclic ring, and is a compound generically called lactone.

Examples of cyclic esters having a simple structure include β-propiolactone, β-butyrolactone, γ-butyrolactone, γ-valerolactone, γ-caprolactone, σ-valerolactone, ε-caprolactone, and the like. The number of ring members of the heterocyclic ring of the cyclic ester is not particularly limited, and further, for example, any side chain may be bonded to a ring member of the heterocyclic ring. The cyclic ester may be used alone, or two or more types thereof may be used in combination.

From the viewpoint of further improving the abrasion resistance of the image formed by the ink composition of the embodiment, among the cyclic esters exemplified above, a cyclic ester having 3- or more and 7- or less membered ring is preferable, a cyclic ester having 5- or 6-membered ring is more preferably used, and in any case, it is more preferable that the cyclic ester do not have a side chain.

Specific examples of such cyclic esters include β-butyrolactone, γ-butyrolactone, and γ-valerolactone. In addition, since such a cyclic ester has a particularly high affinity with polyvinyl chloride, in a case where it is attached to a recording medium containing polyvinyl chloride, it is possible to obtain an extremely remarkable effect of enhancing the abrasion resistance.

In a case of blending the cyclic ester, the content with respect to the total amount of the ink jet ink composition (total amount in a case where a plurality of types are used) is 2% by mass or more and 40% by mass or less, preferably 5% by mass or more and 40% by mass or less, more preferably 10% by mass or more and 30% by mass or less, and particularly preferably 10% by mass or more and 20% by mass or less. In a case where the content is within the above range, it is more preferable from the viewpoint of the abrasion resistance, the coloring property, ejection stability, glossiness, and aggregation unevenness suppression.

1.1.3. Other Solvents

In addition to the above, the ink jet ink composition according to the embodiment can use the following compounds as the solvent.

Examples of such solvents include alcohols (methyl alcohol, ethyl alcohol, propyl alcohol, butyl alcohol, isopropyl alcohol, fluorinated alcohol, and the like), ketones (acetone, methyl ethyl ketone, cyclohexanone, and the like), carboxylic acid esters (methyl acetate, ethyl acetate, propyl acetate, butyl acetate, methyl propionate, ethyl propionate, and the like), ethers (diethyl ether, dipropyl ether, tetrahydrofuran, dioxane, and the like), polyhydric alcohols (ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, trimethylolpropane, and the like), and the like.

In addition, as the solvent, (polyhydric) alcohols may be contained. Examples of (polyhydric) alcohols include glycerin, propylene glycol, dipropylene glycol, 1,2-butanediol, 1,2-pentanediol, 1,2-hexanediol, 1,2-heptanediol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, 2-methylpentane-2,4-diol, and the like.

From the viewpoint of ensuring the effect of improving wet spreadability and permeability on the recording medium to reduce density unevenness, and ensuring storage stability and ejection reliability, in a case where the (polyhydric) alcohols are contained in the ink jet ink composition, the total content with respect to the total mass of the ink jet ink composition is preferably 0.05% by mass or more and 30% by mass or less, and more preferably 0.1% by mass or more and 30% by mass or less. When the content of (polyhydric) alcohols is within the above range, wettability, permeability, and drying property of the ink are improved, and an image having a good print density (coloring property) may be obtained in some cases. In addition, when the content of (polyhydric) alcohols is within the above range, the viscosity of the ink can be made appropriate and the occurrence of nozzle clogging, and the like can be reduced in some cases.

In addition, amines may be blended in the ink jet ink composition and examples thereof include hydroxylamine such as triethanolamine, tripropanolamine, tributanolamine, N, N-dimethyl-2-aminoethanol, N, N-diethyl-2-aminoethanol, and the like, and one or a plurality of types thereof can be used. In a case of containing amines, the total content with respect to the total mass of the ink jet ink composition is preferably 0.05% by mass or more and 5% by mass or less, and more preferably 0.1% by mass or more and 3% by mass or less.

In addition, examples of the solvent include higher fatty acid esters such as methyl laurate, isopropyl hexadecanoate (isopropyl palmitate), isopropyl myristate, methyl oleate, ethyl oleate, dibasic acid diester in which dicarboxylic acid of an aliphatic hydrocarbon having 2 to 8 carbon atoms (carbon number excluding carbon of carboxyl group) is diesterified with an alkyl group having 1 to 5 carbon atoms, and alkyl amides (N,N-dimethyl decanamide, and the like) obtained by amidating monocarboxylic acids (carbon number excluding carbon of carboxyl group) of aliphatic hydrocarbons having 6 to 10 carbon atoms (substituents substituting amide nitrogen atom are each independently a hydrogen atom or an alkyl group having 1 to 4 carbon atoms), and the like.

One or a plurality of types of the other solvents exemplified herein can be added to the ink jet ink composition in an appropriate blending amount.

1.2. Pigment

It is preferable that the ink jet ink composition of the embodiment contain C.I. Pigment Orange-43 (PO-43) as the pigment. By including C.I. Pigment Orange-43 (PO-43), recorded matter can provide an excellent weather resistance suitable for outdoor use and a wide color reproduction range of warm color.

PO-43 is a pigment of CAS Registry Number 4424-06-0 and the chemical name is bisbenzimidazo [2,1-b:2',1'-i] benzo [lmn] [3,8] phenanthroline-8,17-dione, or 1,8-(1H-benzimidazole-2,1-diylcarbonyl)-5,4-(1H-benzimidazole-2, 1-diylcarbonyl) naphthalene. PO-43 has a penolin structure and is assigned "penolin orange" as a common name. The hue of PO-43 is a bright reddish orange. "C.I." is an abbreviation for color index. When the non-aqueous ink jet ink composition contains the C.I. Pigment Orange-43 (Pigment Orange-43, PO-43), it is possible to widen a color reproduction range of the warm color and to record a recorded matter excellent in the weather resistance and the coloring property. An excellent coloring property is advantageous in that it possible to reduce the amount of ink adhering to the recording medium required for printing at a predetermined density. The fact that the amount of ink adhering is small is advantageous in terms of improving the image quality due to accelerating drying and reducing aggregation unevenness, which is advantageous in terms of reduction in printing cost.

The color reproduction range of the warm color refers to a range in which a* and b* are both positive in the L* a* b* color system recommended by CIE (International Commission on Illumination). In the embodiment, the ink composition containing C.I. Pigment Orange-43 is referred to as a specific non-aqueous ink composition. The ink composition containing C.I. Pigment Orange-43 of the embodiment may contain at least C.I. Pigment Orange-43 and may be orange ink, yellow ink, red ink, magenta ink, or the like. It may be an ink particularly used for printing a color of a warm color as compared with the basic color ink described later. Specifically, it is particularly useful in a case where it is used as an orange ink (orange ink composition) because the orange color reproduction range is wide. An orange ink is an ink used for orange type coloring. The orange ink shall be at least the orange ink in a case where the trade name is an orange ink or ink with a trade name that is substantially similar to the orange ink. In addition, an ink which is particularly used for orange printing as compared with the basic color ink described later corresponds to the orange ink.

As PO-43, commercially available products can be used, and can be obtained, for example, "Hostaperm Orange" of Clariant Corporation, "PV Gast Orange GRL", "Fasogen Super Orange 6200" manufactured by DIC Corporation, "Lionogen Orange GR-F" manufactured by Toyo Ink Mfg. Co., Ltd. or the like.

The volume average particle diameter of PO-43 contained in the ink jet ink composition of the embodiment is preferably 100 nm or more and 400 nm or less, and more preferably 150 nm or more and 300 nm or less from the viewpoints of the ejection stability, the weather resistance, and the coloring property. Here, the volume average particle diameter of the pigment can be evaluated by a laser diffraction or scattering method. Specifically, the specimen (pigment) to be inked is diluted to 1000 ppm or less with diethylene glycol diethyl ether (DEGdEE), and the diluted specimen can be measured by reading the value of median diameter D50, using a laser diffraction or scattering measurement device (for example, Microtrac UPA 250 (manufactured by Nikkiso Co., Ltd.)), in an environment of 20° C. Therefore, even in a case where PO-43 having different volume average particle diameter is mixed and used, it is possible to measure the respective volume average particle diameter and the volume average particle diameter of the mixture.

The content of PO-43 with respect to the total amount of the ink jet ink composition of the embodiment is preferably 0.05% by mass or more and 10% by mass or less, further preferably 0.1% by mass or more and 10% by mass or less, further more preferably 1% by mass or more and 10% by mass or less, more preferably 2% by mass or more and 8% by mass or less, and further preferably 3% by mass or more and 7% by mass or less.

On the other hand, the ink jet ink composition of the embodiment may further contain a coloring material in addition to the above-described PO-43. Examples of such coloring materials include a pigment and a dye having a hue similar to that of PO-43, and include a pigment assigned with a number of C.I. Pigment Orange, a pigment assigned the number of C.I. Pigment Red by a color index number, and the like.

1.3. Fixing Resin

It is preferable that the ink jet ink composition according to the embodiment contain a fixing resin. The fixing resin is a resin which protects and adheres the solid content contained in the ink such as a pigment to the recording medium to enhance the abrasion resistance. Examples of fixing resins that can be used include a vinyl chloride-based resin, a (meth) acryl-based resin, a urethane-based resin, a polyether-based resin, a polyester-based resin, and the like. In a case where the solvent contained in the ink is the cyclic ester solvent, the fixing resin is dissolved well and can be dissolved in the ink. As a result, the ink can be firmly fixed on the surface of the recording medium by the fixing resin, and thus the abrasion resistance of the recorded matter is excellent. The ejection stability during the ink jet ejection does not reduce when the fixing resin which is not completely dissolved in the ink remains as foreign matters. Among the fixing resins, the vinyl chloride-based resin and the (meth) acryl-based resin are particularly excellent in solubility in the solvent, particularly in the cyclic ester, and particularly excellent in the abrasion resistance, which is preferable.

Examples of vinyl chloride-based resins include vinyl chloride polymers, vinyl chloride copolymers, and the like, and examples of the vinyl chloride copolymer include copolymers containing vinyl chloride and vinyl acetate, and the like. In a case where the solvent contained in the ink is the solvent of the solvent group A, the copolymer containing vinyl chloride and vinyl acetate can be dissolved in the ink with particularly excellent solubility. As a result, it is possible to firmly fix the ink on the surface of the recording medium containing the vinyl chloride-based resin by the copolymer containing vinyl chloride and vinyl acetate dissolved in the solvent.

The vinyl chloride-based resin can be obtained by a normal method, and can be obtained, for example, by suspension polymerization. Specifically, water, a dispersant, and a polymerization initiator are charged into a polymerization vessel and degassed, thereafter vinyl chloride and vinyl acetate are injected under pressure to perform suspension polymerization, or a portion of vinyl chloride and vinyl acetate are injected under pressure to start the reaction, and suspension polymerization can be performed while injecting under pressure the remaining vinyl chloride into the reaction.

It is preferable that the vinyl chloride-based resin contain 70% to 90% by mass of the vinyl chloride unit, as a constitution. Within the above range, since it is stably dissolved in the ink jet ink composition, it is excellent in long-term storage stability. Furthermore, it is excellent in the ejection stability, and excellent fixability to the recording medium can be obtained.

For example, the vinyl chloride-based resin may have other constituent units with vinyl chloride unit and vinyl acetate unit, if necessary, and examples thereof include a carboxylic acid unit, a vinyl alcohol unit, and a hydroxyalkyl acrylate unit. Among these, vinyl alcohol unit is particularly preferable. It can be obtained by using monomers corresponding to each of the above-described units. Specific examples of the monomer assigning the carboxylic acid unit include maleic acid, itaconic acid, maleic anhydride, itaconic anhydride, acrylic acid, and methacrylic acid. Specific examples of the monomer assigning the hydroxyalkyl acrylate unit include hydroxyethyl (meth) acrylate, hydroxyethyl vinyl ether, and the like. The content of these monomers is not limited as long as the effect of the invention is not impaired, but it can be copolymerized, for example, within the range of 15% by mass or less based on the total amount of the monomers.

A commercially available resin may be used as the vinyl chloride-based resin, and examples thereof include Solbin CN, Sorbin CNL, Solbin C5R, Solbin TA5R, Solbin CL (hereinbefore, manufactured by Nisshin Chemical Industry Co., Ltd.), and the like.

The average polymerization degree of the vinyl chloride-based resin is not particularly limited, but is preferably 150 to 1100, and more preferably 200 to 750. In a case where the average polymerization degree is within the above range, the vinyl chloride-based resin stably dissolves in the ink composition of the embodiment, so that it is excellent in long-term storage stability. Furthermore, it is excellent in the ejection stability, and excellent fixability to the recording medium can be obtained. The average polymerization degree of the vinyl chloride-based resin is calculated from the specific viscosity measured, and can be obtained according to the average polymerization degree calculation method described in "JIS K6720-2".

In addition, the number average molecular weight of the vinyl chloride-based resin is not particularly limited, but is preferably 10000 to 50000, and more preferably 12000 to 42000. The number average molecular weight can be measured by GPC and can be obtained as a relative value in terms of polystyrene conversion.

The content of the vinyl chloride-based resin in the ink jet ink composition is, for example, 0.05% to 10% by mass, preferably 0.5% to 5% by mass, more preferably 0.5% to 3% by mass, further preferably 0.5% to 2.5% by mass, and particularly preferably 1% to 2% by mass. When the content is within the above range, the solubility in the solvent is excellent, the ejection stability of the ink is excellent, excellent fixability is obtained to the recording medium, and the abrasion resistance is excellent. In addition, when the content is within the above range, the recorded matter does not look whitish and cloudy, and excellent coloring can be obtained. This is particularly preferable in order to obtain excellent coloring property of warm color, particularly in a case of an ink containing C.I. Pigment orange-43.

The (meth) acryl-based resin ((meth) acrylic resin) refers to an acrylic resin or a methacrylic resin. It is a polymer of a (meth) acrylic monomer or a copolymer of the (meth) acrylic monomer and another monomer. Examples of the (meth) acrylic resins include homopolymers of alkyl-(meth) acrylates such as ethyl-, propyl-, or butyl-(meth) acrylate: hydroxyalkyl (meth) acrylates such as hydroxymethyl-, hydroxyethyl-, hydroxypropyl-, hydroxybutyl-, hydroxypentyl-(meth) acrylate, or copolymers thereof, but as the (meth) acryl-based resin, a methyl (meth) acrylate homopolymer, a copolymer of methyl (meth) acrylate and butyl (meth) acrylate, a copolymer of methyl (meth) acrylate and ethyl (meth) acrylate, or a copolymer of methyl (meth) acrylate and propyl (meth) acrylate is preferred.

As a copolymer of a (meth) acrylic monomer and the other monomer, an olefin (meth) acrylic copolymer resin such as a styrene (meth) acrylic copolymer resin can be mentioned. The mass ratio of the (meth) acrylic monomer to the (meth) acrylic monomer in the copolymer of the other monomer is preferably 30% by mass or more, and more preferably 50% by mass or more.

Examples of commercially available (meth) acrylic resins include "Paraloid B99N" (methyl methacrylate/butyl methacrylate copolymer), Tg: 82° C., weight average molecular weight: 15,000) and "Paraloid B60" (methyl methacrylate/butyl methacrylate copolymer), Tg: 75° C., weight average molecular weight: 50,000) manufactured by Rohm and Haas Co., Ltd.

The (meth) acrylic resin is preferably polyoxyethylene glycol dialkyl ether represented by General Formula (1) or a (meth) acrylic resin obtained by solution polymerization in polyoxyethylene (alkylene) glycol alkyl ether acetate represented by General Formula (3) using a radical polymerization initiator.

The solution polymerization of a (meth) acrylic resin is formed, and thus the solubility in the solvent can be improved, and the ink jet ink composition having the excellent ejection stability, the abrasion resistance, and re-solubility can be obtained.

The molecular weight and glass transition temperature (Tg) of the (meth) acrylic resin are arbitrary, but the weight average molecular weight of the (meth) acrylic resin in terms of polystyrene conversion is 8,000 to 100,000, and preferably 10,000 to 60,000. In addition, the glass transition temperature (Tg) of the (meth) acryl-based resin is preferably 70° C. or higher, and more preferably 80° C. or higher. The upper limit of the glass transition temperature is approximately 120° C. The weight average molecular weight or Tg is set within the above range, and thus the effect of obtaining the good ink storage stability and a printed product having good drying property, concealing the property, and the like becomes particularly remarkable, which is preferable.

The content of the (meth) acryl-based resin in the ink jet ink composition can be, for example, 0.05% to 10% by mass, preferably 0.5% to 7% by mass, more preferably 1% to 6% by mass, further preferably 2% to 5% by mass, further preferably 2.5% to 5% by mass, particularly more preferably 2.5% to 4.5% by mass, and more particularly preferably 3% to 4.5% by mass. When the content is within the above range, the solubility in the solvent is excellent, the ejection stability of the ink is excellent, the excellent fixability to the recording medium is obtained, and thus the abrasion resistance is excellent.

Other fixing resin may be contained in the ink. Examples of other resins include cellulose resin such as rosin-modified resin, phenol resin, terpene resin, urethane resin, polyester resin, polyether resin, polyamide resin, epoxy resin, cellulose acetate butyrate, vinyl toluene-α-methylstyrene copolymer resin, and the like. As other resins, urethane resin, polyester resin, and polyether resin are preferable from the viewpoint that the solubility and the abrasion resistance are excellent.

The content of the fixing resin in the ink jet ink composition can be, for example, 0.05% to 10% by mass, preferably 0.5% to 7% by mass, more preferably 1% to 6% by mass, and further more preferably 2% to 5% by mass. When the content of the fixing resin is within the above range, the solubility in the solvent is excellent, the ejection stability of the ink is excellent, the excellent fixability to the recording medium is obtained, and thus the abrasion resistance is excellent.

In the ink jet ink composition, the ratio of the total content of the fixing resin with respect to the total content of the cyclic ester is preferably 0.1 to 1.5, more preferably 0.1 to 1.0, further more preferably 0.2 to 0.5, and particularly preferably 0.3 to 0.5 on a mass basis. Within the range of the above amount ratio, the fixing resin can be easily dissolved in the solvent, and thus the clogging of the nozzle is less likely to occur and the ink fixability to the surface of the recording medium can be sufficiently improved. In a case of a vinyl chloride-based resin and/or a (meth) acryl-based resin as the fixing resin in the content and amount ratio of the above-described fixing resin, it is more preferable in terms of the above point.

In a case where the ink contains the vinyl chloride-based resin and the (meth) acryl-based resin as the fixing resin, it is preferable from the viewpoint that the abrasion resistance, the weather resistance, the ejection stability, and the like can be excellent with good balance.

1.4. Others

Surfactant

A silicone-based surfactant, a fluorine-based surfactant, or a polyoxyethylene derivative serving as a nonionic surfactant may be added to the ink jet ink composition according to the embodiment, in addition to the organic solvent, from the viewpoint of lowering the surface tension and improving the wettability with the recording medium.

As the silicone-based surfactant, polyester-modified silicone or polyether-modified silicone is preferably used. Specific examples thereof include BYK-347, 348, BYK-UV 3500, 3510, 3530, and 3570 (all manufactured by BYK Japan K.K.).

As the fluorine-based surfactant, a fluorine-modified polymer is preferably used, and as a specific example thereof, BYK-340 (manufactured by BYK Japan K.K.) can be mentioned.

In addition, as the polyoxyethylene derivative, an acetylene glycol surfactant is preferably used. Specific examples thereof include Surfynol 82, 104, 465, 485, TG (all manufactured by Air Products Japan Co., Ltd.), Olfine STG, E1010 (all manufactured by Nissin Chemical Industry Co., Ltd.), Nissan Nonion A-10R, A-13R (both manufactured by NIPPON OIL CO., LTD.), Floren TG-740W, D-90 (manufactured by Kyoeisha Chemical Co., Ltd.), Noigen CX-100 (manufactured by Dai-ichi Kogyo Seiyaku Co., Ltd.), and the like.

The content of the surfactant in the ink jet ink composition according to the embodiment is preferably 0.05% by mass or more and 3% by mass or less, and more preferably 0.5% by mass or more and 2% by mass or less.

Dispersant

From the viewpoint of improving the dispersion stability of the pigment, the ink jet ink composition according to the embodiment can use any dispersant used in normal ink compositions. Specific examples of such dispersants include polyester-based polymer compound such as Hinoacto KF1-M, T-6000, T-7000, T-8000, T-8350P, T-8000E (all manufactured by Takefu Fine Chemicals Co., Ltd.), Solsperse 20000, 24000, 32000, 32500, 33500, 34000, 35200, 37500 ("Solsperse" manufactured by LUBRIZOL), Disperbyk-161, 162, 163, 164, 166, 180, 190, 191, 192 (all manufactured by BYK Japan K.K.), Flowlen DOPA-17, 22, 33, G-700 (all manufactured by Kyoeisha Chemical Co., Ltd.), AJISPER PB821, PB711 (both manufactured by Ajinomoto Co., Ltd.), LP4010, LP4050, LP4055, POLYMER 400, 401, 402, 403, 450, 451, 453 (all manufactured by EFKA Chemicals), and the like.

In addition, as the dispersant, a metal soap, a polymeric dispersant having a basic group or the like can be used, and the polymeric dispersant having the basic group is preferable. Specifically, those having an amino group, an imino group or a pyrrolidone group as the basic group are preferable. As the polymeric dispersant having the basic group, polyalkylene polyamine, salts of long chain polyamino amide and high molecular weight acid ester, salts of polyamino amide and polar acid ester, modified polyurethane, polyester polyamine, and the like can be used.

Specific examples of polymeric dispersants having the basic group include "Anti-Terra-U (polyamino amide phosphate)", "Anti-Terra-204 (high molecular weight polycarboxylate)", "Disperbyk-101 (polyamino amide phosphate and acid ester) 130 (polyamide)" manufactured by BYK Chemie GmbH. In addition, Solsperse 5000 (phthalocyanine ammonium salt-based), 13940 (polyester polyimine), 17000, 18000, 19000 (polyester polyamine), 11200 (polyester polyimine) manufactured by Avicia Inc. can be mentioned. In addition, V-216 and V-220 (polyvinyl pyrrolidone having a long chain alkyl group) manufactured by ISP Inc. can be mentioned.

In the ink composition according to the embodiment, in a case where the dispersant is used, the dispersant is appropriately selected depending on the pigment contained, but is preferably 5 parts by mass or more and 200 parts by mass or less, and more preferably 30 parts by mass or more and 120 parts by mass or less, with respect to 100 parts by mass of the pigment content in the ink composition. A suitable pigment dispersant may be used depending on the pigment to be used so as to have excellent dispersion stability.

Others

In addition to the above components, the ink jet ink composition of the embodiment may contain a substance for imparting predetermined performance such as chelating agents such as ethylenediamine tetraacetate (EDTA), antiseptic/fungicide, rust inhibitor, or the like.

2. INK SET

It is preferable that the ink set according to the embodiment be an ink set including at least a non-aqueous ink jet ink composition containing the above-described solvent and Pigment Orange-43 (PO-43), a non-aqueous cyan ink jet ink composition containing a solvent and a pigment, a non-aqueous magenta ink jet ink composition containing a solvent and a pigment, and a non-aqueous yellow ink jet ink composition containing a solvent and a pigment, from the viewpoint that the color reproduction range of the warm color is wide and the weather resistance of the recorded matter is excellent.

The non-aqueous ink jet ink composition containing above-described Pigment Orange-43 (PO-43) is preferable from the viewpoint of exhibiting the above-described effect, in a case where the above-described ink jet ink composition contains the solvent and Pigment Orange-43 (PO-43) as the pigment. Each of the non-aqueous cyan ink jet ink composition, the non-aqueous magenta ink jet ink composition, and the non-aqueous yellow ink jet ink composition (hereinafter referred to as basic color ink) preferably have the same composition as the above-described ink jet ink composition except that these contain a cyan pigment, a magenta pigment, and a yellow pigment as the pigments, and are particularly preferable in view of exhibiting the above-described effect, in a case of using particularly the solvent A, further a solvent A having the flash point of 140° C. or lower, and further more an ink containing a solvent A having the flash point of 70° C. or lower and/or a solvent A which is a glycol monoether.

As the pigment contained in the basic color ink composition, it is possible to use a pigment such as a colored inorganic pigment and a colored organic pigment which is respectively normally used in the non-aqueous ink compositions in the related art. Examples of the pigment include azo pigments such as azo lake, insoluble azo pigment, condensed azo pigment, chelate azo pigment; polycyclic pigments such as phthalocyanine pigment, perylene and perylene pigment, anthraquinone pigment, quinacridone pigment, dioxanzine pigment, thioindigo pigment, isoindolinone pigment, quinophthalone pigment; dye lake such as basic dye-based lake and acidic dye-based lake; organic pigments such as nitro pigments, nitroso pigments, aniline black, daylight fluorescent pigments; inorganic pigment such as carbon black, and the like. The average primary particle diameter of the pigment particles is not particularly limited, but is preferably 50 nm or more and 500 nm or less.

Examples of the magenta pigment used in the magenta ink include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, C.I. Pigment Red 224, and the like.

Examples of the yellow pigment used in the yellow ink include C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, C.I. Pigment Yellow 155, C.I. Pigment Yellow 180, C.I. Pigment Yellow 180, and the like.

Examples of the cyan pigment used in the cyan ink include C.I. Pigment Blue 15, C.I. Pigment Blue 15:2, C.I. Pigment Blue 15:3, C.I. Pigment Blue 16, C.I. Pigment Blue 60, C.I. Pigment Green 7, C.I. Pigment Green 36, C.I. Pigment Blue 15:4, and the like.

One type of pigment for the basic color ink may be used alone for the ink, or two or more types may be used in the mixture. The content of the pigment in the ink composition is preferably 0.5% to 25% by mass, more preferably 1% to 15% by mass, further preferably 2% to 10% by mass, and particularly preferably 3% to 7% by mass.

In a case where each of the basic color ink and the non-aqueous orange ink jet ink composition contains one or more compounds represented by General Formula (1) as the solvent, specifically, it is excellent and well-balanced from the viewpoint of excellent with good balance in properties as the ink composition such as the drying property, the aggregation unevenness suppression, the glossiness, the coloring property, and the like, which is preferable. Specifically, it is preferable from the viewpoint of reducing the aggregation unevenness of the ink because drying is promoted by containing the compound represented by General Formula (1) and having the flash point of 140° C. or lower as the solvent. It is preferable from the viewpoint of reducing the problem that the ink is aggregated and a beautiful secondary color cannot be obtained when recording of a color of a secondary color or more using a plurality of inks. In a case where one or more types of the compounds represented by above-described General Formula (1), and a compound having the flash point of 140° C. or lower, further the flash point of 120° C. or lower, and particularly the flash point of 70° C. or lower and/or of a glycol monoether among these are contained as the solvent, the content thereof is preferably within the range described above.

In a case where each of the basic color ink and the non-aqueous orange ink jet ink composition contains at least one of the cyclic ester solvents described above as the solvent, it is preferable from the viewpoint of more excellent in the abrasion resistance, the weather resistance, and the ejection stability. In a case where one or more cyclic ester is used as the solvent, the content thereof is preferably within the above-described range.

The inset of the embodiment may further contain the other non-aqueous ink jet ink composition. Other non-aqueous ink jet ink compositions include an ink composition containing a pigment different from the above pigments as the pigment, a clear ink composition not used for coloring, and the like. The configuration other than the pigment type of the other non-aqueous ink jet ink composition can be the same as the above-described ink jet ink composition. For example, in a case where a non-aqueous ink jet black ink composition containing a black-based pigment is provided, it is preferable because the color reproduction range of a dark color (color range having a low L* value) is wide. Examples of the black pigment include carbon black (C.I. Pigment Black 7) and the like.

3. INK JET RECORDING METHOD

The ink jet recording method according to the embodiment uses the ink jet ink composition or ink set described above to record on the recording medium by an ink jet method. According to the ink jet recording method of the embodiment, since the above ink jet ink composition or ink set is used, it is possible to form an image having an excellent weather resistance and a wide color reproduction range of warm color, and furthermore it is possible to perform stable ink jet recording and to record an image having excellent in the image quality and the fastness. As the recording medium, a vinyl chloride-based recording medium is preferred from the viewpoint of the above points. In addition, the ink jet ink composition or the ink set that performs recording by the ink jet recording method may be used.

In a case where the solvent of the solvent group A is contained in the ink of the ink jet ink composition or ink set, the solvent interacts with the vinyl chloride-based resin. Therefore, in a case where an image is recorded by adhering liquid droplets of the above-described ink jet ink composition to the surface of the vinyl chloride-based recording medium, the ink jet recording method according to the embodiment is excellent from the viewpoint of firmly fixing on the recording medium.

The vinyl chloride-based recording medium in the ink jet recording method according to the embodiment is not particularly limited as long as the recording medium contains the vinyl chloride-based resin. Examples of the recording medium containing the vinyl chloride-based resin include a hard or soft vinyl chloride-based film or sheet, and the like. Although the ink jet ink composition described above makes it possible to record an image on a nontreated surface of a vinyl chloride-based resin base material and has an excellent effect that makes it unnecessary to use an expensive recording medium like a recording medium having a receiving layer in the related art, it is needless to say that the composition can be applied even to a base material surface-treated with an ink receiving layer.

The ink jet recording apparatus used in the ink jet recording method according to the embodiment is not particularly limited, but a drop-on-demand type ink jet recording apparatus is preferable. In the drop-on-demand type ink jet recording apparatus, an apparatus adopting a piezoelectric element recording method for recording by using a piezoelectric element disposed in a recording head, an apparatus adopting a thermal jet recording method for recording by using thermal energy of a heater of a heating resistance element disposed in a recording head, and the like are available, but any recording method can be adopted. In addition, since the ink jet ink composition according to the embodiment has an advantage that the composition is inactive with respect to the surface of the ejection nozzle subjected to an ink repellent treatment, for example, the composition can be advantageously used for an ink jet recording method in which an ink is ejected from an ink jet recording head having the surface of the ejection nozzle subjected to the ink repellent treatment.

In a case where the recording medium is heated while adhering the ink composition to the recording medium by the ink jet method, it is preferable from the viewpoint that the drying of the ink can be accelerated to reduce the aggregation unevenness, and the abrasion resistance of the recorded matter can be improved. Heating can be performed by providing a heater on a platen, from the side opposite to the recording surface of the recording medium, or by irradiating or blowing electron beam to the recording medium from above the recording surface of the recording medium. The surface temperature of the recording surface of the recording medium when depositing the ink composition is preferably 15° C. or higher, more preferably 20° C. or higher, further preferably 25° C. or higher, particularly preferably 30° C. or higher, more particularly preferably 35° C. or higher, and furthermore preferably 40° C. or higher. Although the upper limit of the temperature is not limited, it is preferably 100° C. or lower, more preferably 70° C. or lower, and further preferably 60° C. or lower. In a case where the temperature is within the above range, it is preferable from the viewpoints of the reducing aggregation unevenness, the ejection stability, the glossiness, the abrasion resistance, and the coloring property.

3. EXAMPLES

Hereinafter, the invention will be further described by illustrating examples, but the invention is not limited by the following examples at all.

3.1. Example of Ink Composition 3.1.1. Preparation of Pigment Dispersion Liquid Pigment Orange 43 (PO-43) having a primary particle diameter of 160 nm was prepared as a pigment. Dispersion liquid was prepared by using Solsperse 17000 (manufactured by Lubrizol Corporation, polyester polyamine) as a dispersant and adding the dispersant in the same mass range to the pigment. As a dispersion medium, a solvent having the largest content as a solvent for each ink composition example was used as the dispersion medium to prepare pigment dispersion liquid. For Pigment Oranges 31, 64 and 71, pigment dispersion liquids were obtained in the same manner as above. The volume average particle diameter of the pigment was all set to approximately 200 nm.

3.1.2. Preparation of Ink Composition

Using the pigment dispersion liquid prepared above, ink compositions with different pigments and compositions were prepared with the material composition illustrated in the table. Each ink composition was prepared by placing the materials illustrated in the table in a container, mixing and stirring with a magnetic stirrer for 2 hours, and thereafter filtering with a membrane filter having a pore diameter of 5 μm to remove impurities such as dust and coarse particles. The numerical values in the composition column in the table represent % by mass.

Abbreviations or trade names illustrated in the table are as follows.

Pigment
PO-43: C.I. Pigment Orange 43
PO-31: C.I. Pigment Orange 31
PO-64: C.I. Pigment Orange 64
PO-71: C.I. Pigment Orange 71

Cyclic Ester Solvent•γ-butyrolactone: trade name, manufactured by Kanto Kagaku Co., Ltd.
  σ-valerolactone: trade name, manufactured by Kishida Chemical Co., Ltd.

General Formula (1) Solvent
  DEGMEE: diethylene glycol methyl ethyl ether, trade name "Hisolve EDM", manufactured by Toho Chemical Industry Co., Ltd., flash point: 64° C.)
  DEGdME: diethylene glycol dimethyl ether, trade name "diethylene glycol dimethyl ether", manufactured by Toho Chemical Industry Co., Ltd., flash point: 56° C.)
  DEGDEE: diethylene glycol diethyl ether, trade name "diethylene glycol diethyl ether", manufactured by Toho Chemical Industry Co., Ltd., flash point: 71° C.)
  DEGBME: diethylene glycol butyl methyl ether, trade name "Hisolve BDM", manufactured by Toho Chemical Industry Co., Ltd., flash point: 94° C.)
  TriEGdME: triethylene glycol dimethyl ether, trade name "triethylene glycol dimethyl ether", manufactured by Kishida Chemical Co., flash point: 113° C.)
  TetraEGdME: tetraethylene glycol dimethyl ether, trade name "tetraethylene glycol dimethyl ether", manufactured by Tokyo Chemical Industry Co., Ltd., flash point: 141° C.)
  TetraEGmBE: tetraethylene glycol monobutyl ether, trade name "BUTYCENOL 40", manufactured by KH Neochem Co., flash point: 177° C.)

Other Solvents AF-7: naphthenic hydrocarbon solvent, manufactured by JX Nichigo Nisseki Energy Co., Ltd.
  Isooctyl palmitate: manufactured by Nikko Chemicals Co., Ltd., fatty acid ester solvent.

<Pigment Dispersant>
Solsperse 17000: trade name, manufactured by Lubrizol Corporation, polyester polyamine <Surfactant>
BYK340: trade name, manufactured by BYK Japan K.K., silicone-based surfactant <Fixing Resin>
Solbin CL: trade name, manufactured by Nisshin Chemical Industry Co., Ltd., vinyl chloride-vinyl acetate copolymer
Paraloid B60: trade name, manufactured by Dow Chemical Company, (meth) acrylic resin 3.1.3. Evaluation Test
3.1.3.1. Weather Resistance Using each prepared ink composition, printing was performed by adjusting the duty so that the initial OD value was 0.5, 1.0, and the maximum value by an ink jet printer (model "SC-s70650" manufactured by Seiko Epson Corporation). The recording resolution was 1440×1440 dpi. At the time of ink adhesion, the platen heater was operated to set the surface temperature of the recording medium to the value in the table. A glossy polyvinyl chloride sheet (Roland DG Co., model number SV-G-1270G) was used as a recording medium. The obtained recorded matter was allowed to stand for 1 hour in a general environment and dried. Thereafter, the obtained recorded matter was put into a chamber of a xenon weather meter (manufactured by Suga Test Instruments Co., Ltd.), and a cycle test of "light irradiation for 25 minutes"→"light irradiation+water rainfall for 20 minutes-"→"light irradiation for 30 minutes"→"water rain for 60 minutes" was performed. The cycle test was performed continuously for 4 weeks, and the recorded matter was taken out after 4 weeks. For each recorded matter taken out, the OD value was measured using a Gretag densitometer (manufactured by Gretag Macbeth), the residual rate (%) of the OD value was obtained, and among the three types of recorded matter having initial OD values of 0.5, 1.0, and the maximum value, the recorded matter having the lowest residual ratio was evaluated. The weather resistance was judged based on the following criteria. The results are illustrated in the table.

5: Residual ratio of OD value is 90% or more
4: Residual ratio of OD value is 87% or more and less than 90%
3: Residual ratio of OD value is 84% or more and less than 87%
2: Residual ratio of OD value is 81% or more and less than 84%
1: Residual ratio of OD value is less than 81%

3.1.3.2. Ejection Stability (Intermittent Evaluation)

Continuous ejection of liquid droplets was performed for 250 seconds from each nozzle of the head for each ink composition with the vibration frequency of the piezo element mounted in the ink jet printer (model "SC-s70650" manufactured by Seiko Epson Corporation) set to 7 kHz in a state where the drive waveform is optimized. Thereafter, the ejection of the liquid droplet was interrupted for 300 seconds (one sequence). Thereafter, in the same manner, operations of continuous ejection of liquid droplets and interruption of ejection were repeated 10 sequences. Meanwhile, the nozzle surface temperature was heated to the same temperature as the recording medium temperature in the table with the heater. At the end of 10 sequences, print stability evaluation (intermittent evaluation) was performed by counting the number of ejection failure nozzles in 360 nozzles. The evaluation results are illustrated in the table. Evaluation criteria are as follows.

4: The number of ejection failure nozzles is 0
3: The number of ejection failure nozzles is 1 to 2
2: The number of ejection failure nozzles is 3 to 4
1: The number of ejection failure nozzles is 5 or more 3.1.3.3. Glossiness (Image Quality)

Each of the ink compositions of Examples and Comparative Examples was solid printed on a glossy polyvinyl chloride sheet at a recording resolution of 1440×1440 dpi at a 100% density using the above printer (Roland DG Co., model number SV-G-1270G). At the time of ink adhesion, the platen heater was operated to set the surface temperature of the recording medium to the value in the table. Thereafter it dried for 1 day at 25° C.-65% relative humidity (RH) to prepare recorded matter of each example. The recorded matter obtained in this manner was measured for the gloss of 20° reflection on the recording surface using the gloss meter MULTI Gloss 268 (manufactured by Konica Minolta Holdings, Inc.). The evaluation results are illustrated in the table. Evaluation criteria are as follows.

4: 50 or more
3: 40 or more and less than 50
2: 30 or more and less than 40
1: Less than 30

3.1.3.4. Aggregation Unevenness

Recorded matters of each example were prepared in the same manner as in the above "evaluation of glossiness". The aggregation unevenness was evaluated by visually observing the aggregation unevenness of the pigment on the recording surface of the recording matter obtained in this manner. The evaluation results are illustrated in the table. Evaluation criteria are as follows.

4: No aggregation unevenness is observed.
3: Aggregation unevenness is observed by magnification observation.
2: Some aggregation unevenness is observed.
1: Aggregation unevenness is conspicuous.

3.1.3.5. Abrasion Resistance

Recorded matters of each example were prepared in the same manner as in the above "evaluation of glossiness". The abrasion resistance was evaluated for the recorded matter obtained in this manner using a Gakushin type friction fastness tester (trade name "AB-301" manufactured by Tester Sangyo Co., Ltd.) according to JIS K 5701 (ISO 11628). That is, a cotton cloth was placed on the recording surface of the recorded matter, rubbed by reciprocating 20 times at a load of 500 g, and the detached state of the recording surface of the recorded matter after rubbing was visually observed. The evaluation results are illustrated in the table. Evaluation criteria are as follows.

3: No stain on the cotton cloth is observed. No scratch on the recording surface is observed.
2: Recorded matter adheres to the cotton cloth. Scratch on the recording surface is not substantially observed.
1: Recorded matter adheres to the cotton cloth. Scratch on the recording surface is observed.

3.1.3.6. Coloring Property

Printing was performed in the same manner as in the weather resistance evaluation described above, and the initial OD value was similarly measured. Here, the adhesion amount of the ink to the recording medium was 8 mg/inch$^2$, and the recording resolution was 1440×1440 dpi. The evaluation results are illustrated in the table.

4: Initial OD value is 1.0 or more
3: Initial OD value is 0.85 or more and less than 1.0
2: Initial OD value is 0.7 or more and less than 0.85
1: Initial OD value is less than 0.7

TABLE 1

| | | Composition No | | | | | | | | | |
|---|---|---|---|---|---|---|---|---|---|---|---|
| | | 1 | 2 | 3 | 4 | 5 | 6 | 7 | 8 | 9 | 10 |
| Pigment | PO-43 | 4.0 | 4.0 | 4.0 | 4.0 | 4.0 | 4.0 | 4.0 | 4.0 | 4.0 | 4.0 |
| | PO-31 | | | | | | | | | | |
| | PO-64 | | | | | | | | | | |
| | PO-71 | | | | | | | | | | |
| Cyclic Ester Solvent | γ-butyrolactone | 20.0 | | | 20.0 | 20.0 | 20.0 | 20.0 | 20.0 | 5.0 | 40.0 | 20.0 |
| | σ-valerolactone | | 20.0 | | | | | | | | |

TABLE 1-continued

| | | | | | | | | | | | |
|---|---|---|---|---|---|---|---|---|---|---|---|
| General Formula (1) Solvent | DEGMEE | 65.5 | 65.5 | 50.5 | | | | 39.0 | 80.5 | 45.5 | 50.5 |
| | DEGdME | | | | 65.5 | | | | | | |
| | DEGDEE | | | | | 65.5 | | | | | |
| | DEGBME | | | | | | 65.5 | | | | |
| | TnEGdME | | | | | | | 26.5 | | | |
| | TetraEGdME | | | 15.0 | | | | | | | |
| | TetraEGmBE | | | | | | | | | | 15.0 |
| Other Solvents | AF-7 | | | | | | | | | | |
| | Isooctyl palmitate | | | | | | | | | | |
| Pigment Dispersant | Solsperse 17000 | 4.0 | 4.0 | 4.0 | 4.0 | 4.0 | 4.0 | 4.0 | 4.0 | 4.0 | 4.0 |
| Surfactant | BYK340 | 1.5 | 1.5 | 1.5 | 1.5 | 1.5 | 1.5 | 1.5 | 1.5 | 1.5 | 1.5 |
| Fixing Resin | Solbin CL | 1.5 | 1.5 | 1.5 | 1.5 | 1.5 | 1.5 | 1.5 | 1.5 | 1.5 | 1.5 |
| | Paraloid B60 | 3.5 | 3.5 | 3.5 | 3.5 | 3.5 | 3.5 | 3.5 | 3.5 | 3.5 | 3.5 |
| | Total | 100.0 | 100.0 | 100.0 | 100.0 | 100.0 | 100.0 | 100.0 | 100.0 | 100.0 | 100.0 |
| Fixing Resin/cyclic Ester Solvent | | 0.3 | 0.3 | 0.3 | 0.3 | 0.3 | 0.3 | 0.3 | 1.0 | 0.1 | 0.3 |

| | | Composition No | | | | | | | | |
|---|---|---|---|---|---|---|---|---|---|---|
| | | 11 | 12 | 13 | 14 | 15 | 16 | 17 | 18 | 19 |
| Pigment | PO-43 | 4.0 | 4.0 | 4.0 | 4.0 | | | | | 4.0 |
| | PO-31 | | | | | 4.0 | | | | |
| | PO-64 | | | | | | 4.0 | | | |
| | PO-71 | | | | | | | 4.0 | 4.0 | |
| Cyclic Ester Solvent | γ-butyrolactone | 20.0 | 20.0 | 20.0 | 20.0 | 20.0 | 20.0 | 20.0 | 20.0 | 20.0 |
| | σ-valerolactone | | | | | | | | | |
| General Formula (1) Solvent | DEGMEE | 65.5 | 65.5 | | | 69.0 | 69.0 | 69.0 | | |
| | DEGdME | | | | | | | | | |
| | DEGDEE | | | | | | | | | |
| | DEGBME | | | | | | | | | |
| | TnEGdME | | | | | | | | | |
| | TetraEGdME | | | 65.5 | | | | | 65.5 | |
| | TetraEGmBE | | | | 65.5 | | | | | |
| Other Solvents | AF-7 | | | | | | | | | 38.0 |
| | Isooctyl palmitate | | | | | | | | | 27.5 |
| Pigment Dispersant | Solsperse 17000 | 4.0 | 4.0 | 4.0 | 4.0 | 4.0 | 4.0 | 4.0 | 4.0 | 4.0 |
| Surfactant | BYK340 | 1.5 | 1.5 | 1.5 | 1.5 | 1.5 | 1.5 | 1.5 | 1.5 | 1.5 |
| Fixing Resin | Solbin CL | 0.5 | 4.5 | 1.5 | 1.5 | 1.5 | 1.5 | 1.5 | 1.5 | 1.5 |
| | Paraloid B60 | 4.5 | 0.5 | 3.5 | 3.5 | 3.5 | 3.5 | 3.5 | 3.5 | 3.5 |
| | Total | 100.0 | 100.0 | 100.0 | 100.0 | 100.0 | 100.0 | 100.0 | 100.0 | 100.0 |
| Fixing Resin/cyclic Ester Solvent | | 0.3 | 0.3 | 0.3 | 0.3 | 0.3 | 0.3 | 0.3 | 0.3 | 0.3 |

TABLE 2

| | | Recording example No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | | Composition No. | | | | | | | | | | |
| | | 1 | 2 | 3 | 4 | 5 | 6 | 7 | 8 | 9 | 10 | 11 |
| Recording medium temperature | | 27° C. | 27° C. | 27° C. | 27° C. | 27° C. | 27° C. | 27° C. | 27° C. | 27° C. | 27° C. | 27° C. |
| Weather Resistance | | 5 | 5 | 5 | 5 | 5 | 5 | 5 | 4 | 5 | 5 | 4 |
| Ejection Stability | | 3 | 3 | 3 | 3 | 3 | 3 | 3 | 2 | 3 | 3 | 3 |
| Glossiness | | 4 | 3 | 4 | 3 | 4 | 4 | 4 | 4 | 3 | 4 | 4 |
| Aggregation Unevenness | | 4 | 4 | 2 | 4 | 3 | 3 | 3 | 4 | 4 | 4 | 4 |
| Abrasion Resistance | | 3 | 3 | 2 | 3 | 3 | 3 | 3 | 2 | 3 | 3 | 2 |
| Coloring Property | | 3 | 3 | 3 | 2 | 4 | 4 | 4 | 4 | 2 | 4 | 3 |

TABLE 2-continued

| | Recording example No. | | | | | | | | |
|---|---|---|---|---|---|---|---|---|---|
| | 12 | 13 | 14 | 15 | 16 | 17 | 18 | 19 | 20 | 21 |
| | Composition No. | | | | | | | | |
| | 12 | 5 | 13 | 14 | 15 | 16 | 17 | 18 | 19 | 13 |
| Recording medium temperature | 27° C. | 40° C. | 27° C. | 27° C. | 27° C. | 27° C. | 27° C. | 27° C. | 27° C. | 40° C. |
| Weather Resistance | 5 | 5 | 5 | 5 | 2 | 1 | 3 | 5 | 5 | 5 |
| Ejection Stability | 2 | 2 | 3 | 3 | 3 | 3 | 3 | 3 | 2 | 2 |
| Glossiness | 3 | 4 | 3 | 3 | 4 | 4 | 4 | 3 | 3 | 2 |
| Aggregation Unevenness | 4 | 4 | 1 | 1 | 4 | 4 | 4 | 1 | 1 | 1 |
| Abrasion Resistance | 3 | 4 | 2 | 2 | 3 | 3 | 3 | 2 | 2 | 3 |
| Coloring Property | 2 | 3 | 4 | 4 | 3 | 3 | 1 | 2 | 2 | 3 |

3.1.4. Evaluation Results

Compositions 1 to 12 which are the ink compositions containing the solvent A having the flash point of 140° C. or lower and Pigment Orange 43 all exhibited the excellent image quality (reducing aggregation unevenness), the weather resistance, and the coloring property. In addition, the recording example 13 in which the surface temperature of the recording medium was further increased, was excellent from the viewpoint of improvement in the image quality and the abrasion resistance, and the coloring property and the ejection stability were improved. On the other hand, the ink compositions 13, 14, and 19 not containing the solvent of the solvent A having the flash point of 140° C. or lower are inferior in the image quality, and the compositions 15 to 17 not containing Pigment Orange 43 were inferior in either the weather resistance or the coloring property. The ink composition 18 containing neither the solvent A nor Pigment Orange 43 having the flash point of 140° C. or lower had relatively better coloring property than the composition 17, but the image quality was inferior. In addition, the recording example 21 in which the surface temperature of the recording medium was further increased using an ink composition not containing the solvent of the solvent A having the flash point of 140° C. or lower, was also inferior in the image quality. In addition, the ink composition 12 containing a relatively large amount of vinyl chloride-based resin tends to be slightly inferior in coloring property, but it is assumed that the recorded matter appears whitish and opaque, so that the coloring property is slightly inferior. From this, it was found that there is a particularly preferable range of the vinyl chloride-based resin, particularly in a case of obtaining excellent coloring of a warm color as an ink containing Pigment Orange 43.

3.2. Ink Set Example

3.2.1. Preparation of Ink Composition

Ink compositions 20 to 23 of other colors were prepared in the same manner as in the ink composition example described above, except that the types of pigment and pigment dispersant were changed. For the pigment dispersion liquid, a pigment dispersant suitable for each pigment was used.

Pigment·P.B.15:3 C.I. Pigment Blue 15:3
P.R.122: C.I. Pigment Red 122
P.Y.155: C.I. Pigment Yellow 155
CB: Carbon black pigment

3.2.2. Evaluation Test

3.2.2.1. Weather Resistance

Printing was performed in the same manner as the weather resistance evaluation of the ink composition example described above. Here, when the L* value is 70 and the hue angle is 45° on the a* b* plane formed by b* capable of reproducing colors on the recording medium using the ink of each ink set, printed matter of the color with the largest value of $C^*=\sqrt{(a^{*2}+b^{*2})}$ was printed and used for evaluation. For confirming the L* a* b* value at that time, a spectrophotometric system (manufactured by Konica Minolta Co., Ltd.) was used. Weather resistance accelerated test, OD value measurement, and evaluation criteria were performed in the same manner as the weather resistance evaluation of the ink composition examples. The evaluation results are illustrated in the table.

3.2.2.2. Gamut Volume

Printing was performed in the same manner as in the weather resistance evaluation. Here, all colors capable of reproducing colors on the recording medium were printed using the ink of each ink set, and the gamut volume of the printable L* a* b* color space was calculated. The results are illustrated in the table.

TABLE 3

| Composition No. | | 20 | 21 | 22 | 23 |
|---|---|---|---|---|---|
| Pigment | P.B.15:3 | 4.0 | | | |
| | P.R.122 | | 4.0 | | |
| | P.Y.155 | | | 4.0 | |
| | CB | | | | 4.0 |
| Cyclic Ester Solvent | γ-butyrolactone | 20.0 | 20.0 | 20.0 | 20.0 |
| | σ-valerolactone | | | | |
| General Formula (1) Solvent | DEGMEE | 65.5 | 65.5 | 65.5 | 65.5 |
| | DEGdME | | | | |
| | DEGDEE | | | | |
| | DEGBME | | | | |
| | TriEGdME | | | | |
| | TetraEGdME | | | | |
| | TetraEGmBE | | | | |
| Other Solvent | AF-7 | | | | |
| | Isooctyl palmitate | | | | |

TABLE 3-continued

| Composition No. | | 20 | 21 | 22 | 23 |
|---|---|---|---|---|---|
| Pigment Dispersant | | 4.0 | 4.0 | 4.0 | 4.0 |
| Surfactant | BYK340 | 1.5 | 1.5 | 1.5 | 1.5 |
| Fixing Resin | Solbin CL | 1.5 | 1.5 | 1.5 | 1.5 |
| | Paraloid B60 | 3.5 | 3.5 | 3.5 | 3.5 |
| Total | | 100.0 | 100.0 | 100.0 | 100.0 |

TABLE 4

| | Ink Set 1 | Ink Set 2 | Ink Set 3 | Ink Set 4 |
|---|---|---|---|---|
| Cyan Ink | Composition 20 | Composition 20 | Composition 20 | Composition 20 |
| Magenta Ink | Composition 21 | Composition 21 | Composition 21 | Composition 21 |
| Yellow Ink | Composition 22 | Composition 22 | Composition 22 | Composition 22 |
| Black Ink | Composition 23 | Composition 23 | Composition 23 | Composition 23 |
| Orange Ink | Composition 1 | Composition 15 | Composition 16 | Composition 17 |
| Weather Resistance | 5 | 2 | 1 | 3 |
| Gamut Volume | 697088 | 672500 | 673000 | 669000 |

3.2.2.3. Aggregation Unevenness

Printing and evaluation were performed in the same manner as in the aggregation unevenness evaluation of the ink composition described above. Here, in order to evaluate the aggregation unevenness in a case of printing the colors of a secondary color or more by the ink set, in the printing, the total ink adhesion amount of the five inks constituting the ink set to the recording medium was the same as the ink adhesion amount in the case of evaluation of the aggregation unevenness of the ink composition, and the ink adhesion amount for each ink was made equal and divided into five equal portions. In addition, the following ink sets 5 and 6 were constituted as the ink set, and printing was performed using the ink sets 1, 5, and 6.

Ink Set 5: Ink Compositions 20 to 23, and 8.
Ink Set 6: Ink Compositions 20 to 23, and 13.
The results are illustrated below.

| Ink set No. | Aggregation unevenness |
|---|---|
| Ink set 1 | 4 |
| Ink set 5 | 3 |
| Ink set 6 | 1 |

3.2.3. Evaluation Results

Ink set 1 containing an orange ink composition containing Pigment Orange 43 exhibited excellent weather resistance of the recorded matter and was wide in the gamut volume. On the other hand, the ink sets 2 to 4 not containing the orange ink composition containing Pigment Orange 43 were inferior in the weather resistance or narrow in the gamut volume. In addition, although Ink sets 1 and 5 in which each ink contains the ink containing the solvent of the solvent A was excellent in reducing the secondary color aggregation unevenness and Ink set 1 was particularly excellent, the ink set 6 containing an ink composition 13 not containing the solvent of the solvent group A was inferior in reducing the secondary color aggregation unevenness.

The invention is not limited to the above-described embodiment, and further various modifications are possible. For example, the invention includes a configuration substantially the same as the configuration described in the embodiment (for example, a configuration having the same function, method, and result, or a configuration having the same purpose and effect). In addition, the invention includes a configuration in which non-essential parts of the configuration described in the embodiment are replaced. In addition, the invention includes configurations that achieve the same effects as the configuration described in the embodiment or configurations that can achieve the same object. In addition, the invention includes a configuration in which a known technique is added to the configuration described in the embodiment.

The entire disclosure of Japanese Patent Application No. 2015-033764, filed Feb. 24, 2015 is expressly incorporated by reference herein.

The invention claimed is:

1. A non-aqueous ink jet ink composition comprising:
   a cyclic ester compound;
   at least one first solvent represented by the following General Formula (1) and having a flash point of 140° C. or lower:

$R^1O-(R^2O)_m-R^3$;

a second solvent represented by the General Formula (1); and
   C.I. Pigment Orange-43 (PO-43) as a pigment,
   wherein, in the at least one first solvent represented by General Formula (1), $R^1$ and $R^3$ each independently represent hydrogen or an alkyl group having 1 to 5 carbon atoms, $R^2$ represents an alkylene group having 2 or 3 carbon atoms, and m represents an integer of 2 to 6,
   wherein the second solvent represented by General Formula (1) includes a glycol monoether compound in which at least one of $R^1$ and $R^3$ is hydrogen, and
   a total content of the glycol monoether of the second solvent is 3% by mass or more and 15% by mass or less with respect to the total amount of the non-aqueous ink jet ink composition.

2. The non-aqueous ink jet ink composition according to claim 1,
   wherein the total content of the first and second solvents represented by General Formula (1) is 10% by mass or more and 95% by mass or less with respect to the total amount of the non-aqueous ink jet ink composition.

3. The non-aqueous ink jet ink composition according to claim 1, further comprising:
   a third solvent represented by General Formula (1) and having a flash point of 70° C. or lower.

4. The non-aqueous ink jet ink composition according to claim 1, which is used for a recording method in which a surface temperature of a recording medium in a process of adhering an ink composition to the recording medium by an ink jet method, is 35° C. or higher.

5. The non-aqueous ink jet ink composition according to claim 1, further comprising:
   a fixing resin.

6. The non-aqueous ink jet ink composition according to claim 1, which is used for recording on a vinyl chloride-based recording medium.

7. An ink set comprising at least:
  the non-aqueous ink jet ink composition according to claim 1; and
  a non-aqueous cyan ink jet ink composition, a non-aqueous magenta ink jet ink composition, and a non-aqueous yellow ink jet ink composition, each containing at least one solvent represented by General Formula (1) and having a flash point of 140° C. or lower and a pigment.

8. An ink jet recording method comprising:
  performing recording on a recording medium by an ink jet method using the non-aqueous ink jet ink composition according to claim 1.

9. An ink jet recording method comprising:
  performing recording on a recording medium by an ink jet method using the ink set according to claim 7.

10. The non-aqueous ink jet ink composition according to claim 1, wherein the glycol monoether has a flash point less than 90° C.

11. The non-aqueous ink jet ink composition according to claim 1, wherein a volume average particle diameter of the PO-43 is 100 nm or more and 400 nm or less.

* * * * *